June 24, 1941.  O. K. BUTZBACH  2,247,164
TRANSMISSION CONTROL MECHANISM
Filed Oct. 12, 1938
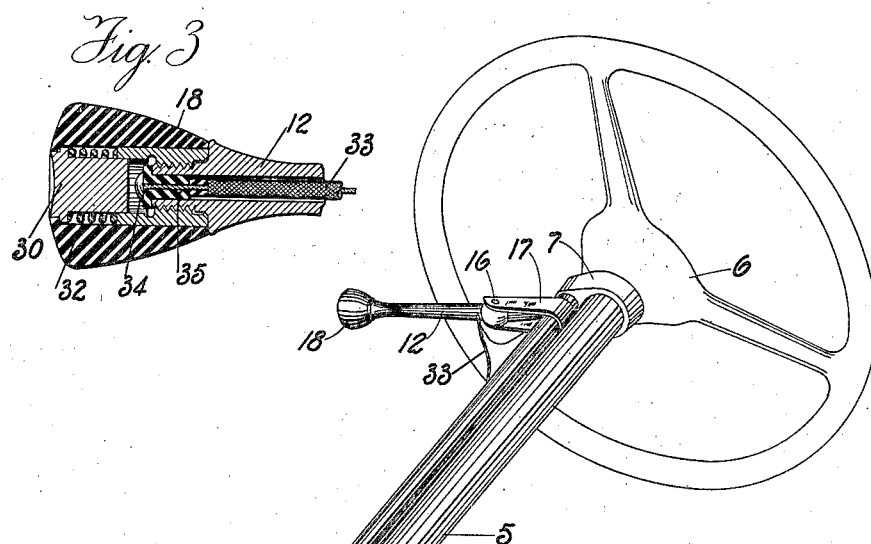
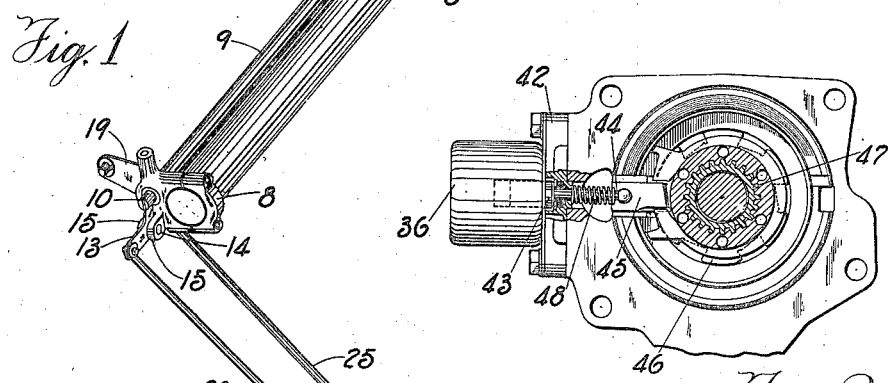
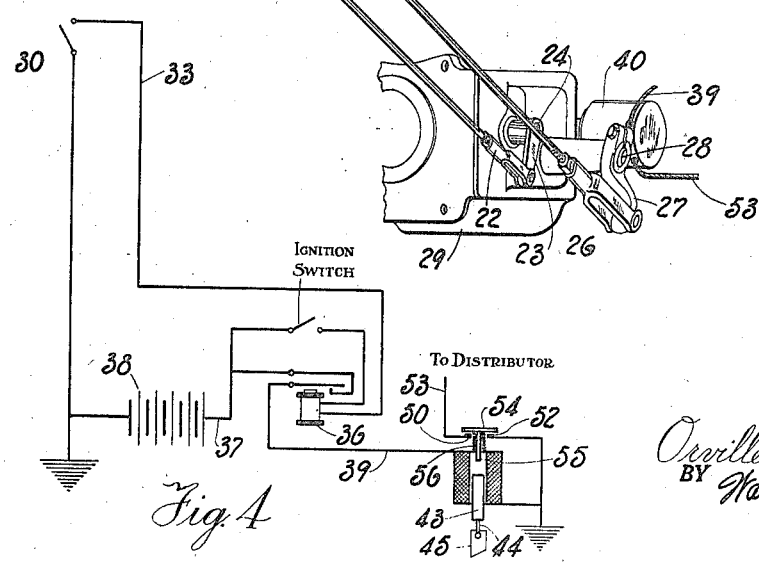
INVENTOR.
Orville K. Butzbach
BY Walter E. Schirmer
ATTORNEY.

Patented June 24, 1941

2,247,164

UNITED STATES PATENT OFFICE 2,247,164

TRANSMISSION CONTROL MECHANISM

Orville K. Butzbach, South Bend, Ind., assignor to The Studebaker Corporation, South Bend, Ind., a corporation of Delaware Application October 12, 1938, Serial No. 234,556

9 Claims. (Cl. 74—472)

This invention relates to a transmission control mechanism and more particularly is directed to the combination with a remote transmission gear shift mechanism, of means associated therewith for controlling the operation of the overdrive mechanism incorporated in the transmission.

The present invention in general is directed to an improvement in the control of a transmission construction such as shown generally in the copending application of myself and Harold E. Churchill, Serial No. 181,491, filed December 24, 1937.

Considering the present invention in more detail, it contemplates the provision of means mounted on the steering post and under the immediate control of the driver for effecting the desired gear shifting of a remotely disposed transmission by means of a pivoted lever supported on the steering post and connected through a suitable motion-transmitting mechanism to the transmission. In combination with such a mechanism there is provided means associated with the control lever for actuating a detent pawl in the overdrive mechanism effecting a release of the sun gear for releasing the overdrive and placing the transmission in free wheeling to facilitate shifting into any desired speed ratio.

One of the objects of the present invention is to provide means associated with the gear shift control lever for controlling the operation of a remotely disposed overdrive mechanism.

Another object of the present invention is to provide a push button in a control lever which when actuating will energize suitable electrical means for releasing the overdrive mechanism so that the operator may shift the transmission into any desired conventional speed and thus gain the benefits of faster acceleration or increased power in emergencies requiring the same.

Another feature of the present invention is the provision of a solenoid associated with the detent pawl of the overdrive mechanism and adapted to be selectively actuated from the gear shift control lever, the solenoid having suitable means for automatically cutting out the engine for a brief interval to release the torque load on the overdrive mechanism, thereby allowing the solenoid to release the locking pawl for releasing the sun gear. Further, the invention provides that this means may be continuously actuated to retain the locking pawl out of engaged position so that the operator may then shift the transmission into the desired speed ratio whereupon release of the control member at the gear shift lever results in restoring overdrive as soon as the torque conditions will allow the pawl to drop back into position.

Other objects and advantages of the present invention will appear more fully from the following detailed description which, taken in conjunction with the accompanying drawing, will disclose to those skilled in the art the particular construction and operation of the preferred form of the present invention.

In the drawing:

Figure 1 is a perspective view of the gear shift control mechanism and portions of the transmission connected thereto;

Figure 2 is an elevational view, partly in section, of the sun gear assembly for the overdrive mechanism in the transmission shown in Figure 1 together with the electric control means therefor;

Figure 3 is an enlarged sectional view through the gear shift control lever showing the actuating button for the overdrive control; and Figure 4 is a diagrammatic view of the circuit which may be employed in carrying out the present invention.

Considering now in detail the drawing, in Figure 1 the usual steering post 5 is provided, at the top of which is mounted the steering wheel 6 in any usual or well known manner. The steering post 5 has at its upper end a bracket 7 disposed below the hub of the steering wheel 6 which, together with the bracket 8 adjacent the lower end of the post is adapted to support the rod or tube 9 extending parallel to and at one side of the post 5. Within the rod or tube 9 is disposed a rod 10 which, at its upper end, is connected to one end of a gear shift control lever 12 and at its lower end is connected to one arm of a bell crank 13 pivotally supported upon the pin 14 carried by the ears 15 of the bracket 8.

The control lever 12 is pivotally mounted intermediate its ends upon a pin 16 carried within a housing bracket 17 secured to the tube 9. The outer end of the rod 12 preferably has an insulated knob or handle portion 18 thereon for facilitating grasping the same to rock the rod 12 above the pivot 16 in order to secure longitudinal movement of the rod 10 within the tube 9, and also for rotating the arm 17 in order to rotate the tube 9 which at its lower end has a radially extending arm 19 secured thereto.

The opposite end of the bell crank 13 is provided with a motion-transmitting rod 20 having a suitable clevis 22 at its opposite end connected to an arm 23 secured to a shaft 24 projecting from the side of the transmission housing. Similarly, the arm 19 has connected thereto a motion-transmitting rod 25 having a clevis 26 connected to an actuating arm 27 carried by a shaft 28 extending into the side of the transmission housing 29. It will be obvious that motion imparted to the bell crank 13 or to the arm 19 will result in respective longitudinal movements of the rods 20 and 25 to selectively actuate the shafts 24 and 28 for effecting the desired gear changes within the transmission 29. This mechanism may be of conventional type or it may be of the type shown in the copending application of Leo O. Burt, Serial No. 199,449 filed April 2, 1938.

Mounted within the end 18 of the control lever 12 is a push button 30 which preferably has a recessed head and is normally urged outwardly by means of a spring 32. The control lever 12 is provided with an axially extending recess adapted to receive the insulated conductor 33 which at its forward end has a contact point 34 insulated from the handle 12 by means of a bushing 35. When the button 30 is pressed into the handle 18 it is adapted to contact the button 34 and thereby produce a ground connection between the conductor 33 and the handle 12, this handle being in turn grounded through the frame to the steering post. The conductor 33, as indicated in Figure 4, is connected to one side of a relay 36, the relay 36 being also connected through the conductor 37 and ignition switch to a battery 38.

As a result the relay 36 is energized, closing its contact and through the conductor 39 transmits current from the battery to the solenoid 40 mounted on the side of the transmission case by the mounting bracket 42. The solenoid 40, as shown in detail in Figure 4, has therein a plunger 43 which has an extending stem portion 44 connected to the locking pawl 45 which engages in the cam member 46 for locking the sun gear 47 against rotation. The details of the construction of the pawl 45, the cam member 46 and the sun gear assembly 47 can be found in the application first above referred to.

Suffice it to say that the pawl 45 is normally urged by a spring 48 into engagement to lock the sun gear against rotation and thus produce the overdrive through the planetary gears associated with the free wheeling mechanism of the transmission. The solenoid 40 is also provided with a pair of contacts 50 and 52, the contact 52 being connected to the ground side of the solenoid while the contact 50 is connected through the conductor 53 to the low tension side of the distributor. A suitable disc 54 is provided in the solenoid assembly having the stem 55 adapted to extend into the core of the solenoid. A suitable spring 56 normally holds the disc 54 out of engagement with the contacts 50 and 52.

In the operation of the mechanism thus far described, the current supplied to the solenoid by contacting the button 30 with the contact 34 energizes the solenoid windings and since the torque load on the pawl 45 prevents its immediate release, results in drawing the disc 54 downwardly to bridge between the contacts 50 and 52. As a result a short circuit is effected at the distributor resulting in cutting out of the motor for a very brief interval which releases torque load on the pawl 45 thereby allowing the solenoid 40 to draw the plunger upwardly into the core thereby drawing the pawl 45 out of locking engagement.

As the plunger 43 is drawn upwardly it engages the lower end of the stem 55 within the core of the solenoid and forces the disc 54 out of contact with the contacts 50 and 52, thereby restoring the ignition circuit to the engine. As long as the operator maintains the button 30 in contact position, the pawl 45 will be held by the solenoid 40 out of operative position and consequently the overdrive mechanism will be released and rotated as a unit with the free wheeling mechanism, placing the car in free wheeling, and allowing the operator to move the gear shift lever 12 in any desired position for effecting any desired speed ratio.

It is to be understood, of course, that during the time the button 30 is actuating the accelerator is released so that the engine idles and thus allows the shifting of the gears in the transmission without any possibility of clashing the same. After the desired gear shift movement has been effected the accelerator can be actuated to pick up the speed of the vehicle and the button 30 can be released. When the speed of the vehicle is such as to approach the cut-in speed of the overdrive mechanism, torque conditions becoming such as to allow the pawl 45 to drop into engagement for locking the sun gear against rotation. The spring 48 will thus force the pawl 45 into engagement with the cam member 46 thereby locking the car in overdrive until it is desired to take the car out of overdrive for allowing increased acceleration or power.

It is believed apparent that with this construction the operator may readily control the transmission from a point adjacent the steering wheel and in addition to being able to shift into any desired speed ratio may also control the actuation of the overdrive mechanism to engage or disengage the same at will and thus maintain the same inoperative during gear shifting movements, if so desired.

I am aware that a number of changes in the details of construction of certain portions of the mechanism herein disclosed may be made without in any way departing from the underlying principles of the present invention and I therefore do not intend to be limited except as defined by the scope and spirit of the appended claims.

I claim:

1. The combination, with a change speed transmission having an overdrive associated therewith, and remotely disposed gear shifting means for said transmission, of electrically responsive means supported on said transmission including an ignition circuit control means operable for cutting off transmission of torque to the transmission and means for disengaging said overdrive, and switch means at said gear shifting means for controlling actuation of said electrically responsive means.

2. In combination, a change speed transmission, a planetary overdrive in said transmission having a normally non-rotative sun gear therein, selective gear shifting means for said transmission including a remotely disposed control handle, means for releasing said sun gear for rotation, and control means carried by said handle for actuating said release means to permit rotation of said sun gear, said last-named means being capable of continued actuation to maintain release of the sun gear during gear shifting movements of said control handle.

3. The combination, with a transmission having an overdrive associated therewith, and remotely disposed gear shifting means, of a solenoid mounted on said transmission, an overdrive release pawl adapted to be actuated by said solenoid, a push button on said gear shifting means for energizing said solenoid, and means controlled by said solenoid for momentarily shorting an ignition circuit prior to actuating said release pawl.

4. The combination of claim 3 wherein said gear shifting means includes a steering column mounted gear shift lever, and said push button is located in the end of said lever.

5. Control means for a vehicle transmission, having an overdrive associated therewith and having remotely disposed gear shift means comprising an overdrive release mechanism, a solenoid for actuating said mechanism, a control circuit for said solenoid including a switch on said gear shift means, and means operable upon actuation of said solenoid for momentarily interrupting the transmission of torque to said transmission prior to actuation of said release mechanism.

6. In a vehicle having a transmission including an overdrive, a locking pawl therefor, a solenoid on said transmission having a plunger connected to said pawl, a second plunger associated with said solenoid and operative upon initial energization of said solenoid to momentarily interrupt the transmission of torque to said transmission whereupon said pawl is drawn out of locking engagement by said solenoid and simultaneously said pawl plunger moves said second plunger out of operative position, and a control circuit for said solenoid including a remotely disposed switch.

7. The combination of claim 6 wherein said second plunger carries a contact disc operative to short an ignition circuit for interrupting the transmission of torque to said transmission.

8. In combination, a transmission having an overdrive, a locking pawl for said overdrive, a solenoid having a pair of plungers, one plunger being connected to said pawl, the other plunger carrying means for shorting an ignition circuit when attracted by said solenoid, and a control circuit for energizing said solenoid to first attract said second plunger for releasing torque on said pawl, whereupon said first plunger is operative to draw said pawl out of locking position and simultaneously engage and move said second plunger out of attracted position.

9. The combination of claim 8 including spring means normally urging both plungers out of attracted position.

ORVILLE K. BUTZBACH.